(12) United States Patent
Cowan et al.

(10) Patent No.: US 8,469,022 B2
(45) Date of Patent: Jun. 25, 2013

(54) SOLAR PANEL ADJUSTMENT MECHANISM

(75) Inventors: Jody L. Cowan, Monroe, NC (US); Robert S. Cowan, Matthews, NC (US)

(73) Assignee: Jody L. Cowan, Monroe, NC (US)

( * ) Notice: Subject to any disclaimer, the term of this patent is extended or adjusted under 35 U.S.C. 154(b) by 912 days.

(21) Appl. No.: 12/235,959

(22) Filed: Sep. 23, 2008

(65) Prior Publication Data

US 2010/0071684 A1 Mar. 25, 2010

(51) Int. Cl.
*F24J 2/52* (2006.01)

(52) U.S. Cl.
USPC ........... 126/605; 126/600; 126/571; 126/573; 126/696; 136/246; 136/243; 136/244; 250/203.4; 52/173.3

(58) Field of Classification Search
USPC .. 126/605, 600, 696, 571, 573, 604; 136/246, 136/243, 244, 291; 250/203.4, 203.1; 52/173.3, 52/173.1
See application file for complete search history.

(56) References Cited

U.S. PATENT DOCUMENTS

| | | | | |
|---|---|---|---|---|
| 3,611,453 A | * | 10/1971 | Lokken | ............................. 5/610 |
| 3,613,659 A | | 10/1971 | Phillips | |
| 4,129,360 A | * | 12/1978 | Deflandre et al. | ............ 359/853 |
| 4,145,021 A | * | 3/1979 | Gaechter et al. | ............... 248/371 |
| 4,291,677 A | | 9/1981 | Monk | |
| 4,297,521 A | | 10/1981 | Johnson | |
| 4,351,319 A | | 9/1982 | Robbins, Jr. | |
| 4,421,943 A | | 12/1983 | Withjack | |
| 4,649,899 A | * | 3/1987 | Moore | ........................ 126/578 |
| 4,700,690 A | * | 10/1987 | Strickland | ..................... 126/607 |
| 5,632,823 A | | 5/1997 | Sharan | |
| 5,613,244 A | | 10/1997 | Bish et al. | |
| 5,961,738 A | * | 10/1999 | Benton et al. | ................. 136/245 |
| 6,037,535 A | | 3/2000 | Yoshino | |
| 6,423,895 B1 | * | 7/2002 | Murphy et al. | ............... 136/245 |
| 6,796,246 B1 | | 9/2004 | Atzpodien et al. | |
| 2006/0118105 A1 | * | 6/2006 | Hon | .............................. 126/600 |
| 2006/0118162 A1 | | 6/2006 | Saelzer et al. | |
| 2007/0039610 A1 | | 2/2007 | Head et al. | |
| 2007/0051401 A1 | | 3/2007 | Aaron | |
| 2007/0215199 A1 | | 9/2007 | Dold et al. | |
| 2007/0235266 A1 | | 10/2007 | Dantas et al. | |
| 2008/0000514 A1 | * | 1/2008 | Lin et al. | ....................... 136/246 |
| 2008/0224107 A1 | | 9/2008 | Polins et al. | |
| 2009/0165841 A1 | * | 7/2009 | Gunn et al. | .................... 136/245 |

* cited by examiner

*Primary Examiner* — Avinash Savani
(74) *Attorney, Agent, or Firm* — Clements Bernard PLLC; Seth L. Hudson

(57) ABSTRACT

The present invention provides methods and systems for a solar panel adjustment device, including a solar panel having a first end and a second end for receiving sunlight, a first pivot frame engaged to the first end of the solar panel for adjusting the solar panel, a second pivot frame engaged to the second end of the solar panel for adjusting the solar panel, and at least one drive means for adjusting the first pivot frame and the second pivot frame independently of one another.

20 Claims, 6 Drawing Sheets

SOLAR PANEL ADJUSTMENT MECHANISM

FIELD OF THE INVENTION

The present invention relates generally to a solar panel adjustment mechanism, and more generally relates to a solar panel adjustment mechanism that comprises two independent pivot frames, enabling a full spectrum of movement.

BACKGROUND OF THE INVENTION

A stationary device that retains a solar panel in place has been utilized for many years. Such devices typically retain a solar panel on a roof or in a clearing, such as a field, thus allowing the solar panel to capture sunlight during daylight hours. These devices are stationary and specifically designed to retain the solar panel at a predetermined height, angle, and location. These devices usually have a set angle at which they hold the solar panel with respect to the surface they are attached.

Adjustable solar panel devices are known, but these devices have limited mobility and are not fully self-contained. Single axis trackers have been developed, and are defined by the device including one rotation point located along the center of the solar panel. The solar panel translates around this one rotation point so the solar panel can track one axis of movement. Two axis trackers also exist to track both axes of movement. Typically, the two axis trackers are mounted on a pole attached at a single point in the center of the panel. The solar panel translates around this one rotation point in any direction to track the sun.

BRIEF SUMMARY OF THE INVENTION

According to the present invention, the solar panel adjustment device includes a solar panel having a first end and a second end for receiving sunlight, a first pivot frame engaged to the first end of the solar panel for adjusting the solar panel, a second pivot frame engaged to the second end of the solar panel for adjusting the solar panel, and at least one drive means for adjusting the first pivot frame and the second pivot frame independently of one another.

According to another preferred embodiment, the solar panel adjustment device includes a bracket engaged to the solar panel, whereby the first pivot frame is engaged to the bracket.

According to yet another preferred embodiment, the solar panel adjustment device includes a base for engaging the first pivot frame and the second pivot frame.

According to yet another preferred embodiment, the first pivot frame and the second pivot frame are substantially similar to scissorjacks.

According to yet another preferred embodiment, the solar panel adjustment device includes a guide, such as a track or the like, positioned on the base for receiving an end of the first pivot frame that allows translational movement of the first pivot frame along the base.

According to yet another preferred embodiment, the solar panel adjustment device includes a guide, such as a track or the like, positioned on the base for receiving an end of the second pivot frame that allows translational movement of the second pivot frame along the base.

According to yet another preferred embodiment, the solar panel adjustment device includes a base, a solar panel having a first end and a second end for receiving sunlight, a first pivot frame having a first end and a second end, wherein the first end is engaged to the first end of the solar panel for adjusting the solar panel, and the second end is engaged to the base, a second pivot frame having a first end and a second end, wherein the first end is engaged to the solar panel and the second end is engaged to the base and translates along the base for adjusting the solar panel.

According to yet another preferred embodiment, the solar panel adjustment device includes a first pivot frame and a second pivot frame that is an actuator.

According to yet another preferred embodiment, the solar panel adjustment device includes a base, a solar panel having a first end and a second end for receiving sunlight, a first pivot frame having a first end and a second end, wherein the first end is engaged to the first end of the solar panel for adjusting the solar panel, and the second end is engaged to a guide positioned on the base, the first pivot frame is adjustable from a substantially horizontal position to a substantially vertical position when fully extended, a second pivot frame having a first end and a second end, wherein the first end is engaged to the second end of the solar panel and the second end is engaged to a guide positioned on the base and translates along the base for adjusting the solar panel, whereby the second pivot frame is adjustable from a substantially horizontal position to a substantially vertical position as the second end translates along the base.

According to yet another preferred embodiment, the solar panel adjustment device includes at least one side wall positioned along the periphery of the base.

According to yet another preferred embodiment, the solar panel adjustment device includes a plate engaged to the second end of the first pivot frame and a plate engaged to the second end of the second pivot frame, wherein the plates are engaged to at least one actuator for adjusting the plates along the base.

According to yet another preferred embodiment, the solar panel adjustment device includes a support arm engaged to the solar panel for engaging the first pivot frame and the second pivot frame to the solar panel.

According to yet another preferred embodiment, the solar panel adjustment device includes a telescoping arm located on the second pivot frame aiding in the engagement of the second pivot frame to the solar panel, wherein the telescoping arm comprises a first portion that is engaged to the second pivot frame and a second portion engaged to the solar panel and the second portion is received within the first portion.

According to yet another preferred embodiment, the solar panel adjustment device includes a support arm engaged to the solar panel that is slidingly engaged to the second pivot arm.

According to yet another preferred embodiment, the solar panel adjustment device is utilized in a railway system.

According to yet another preferred embodiment, the solar panel adjustment device is operated by a control unit for adjusting the solar panel.

BRIEF DESCRIPTION OF THE DRAWINGS

The present invention is illustrated and described herein with reference to the various drawings, in which like reference numbers denote like method steps and/or system components, respectively, and in winch.

DETAILED DESCRIPTION OF THE INVENTION

Figure 1:
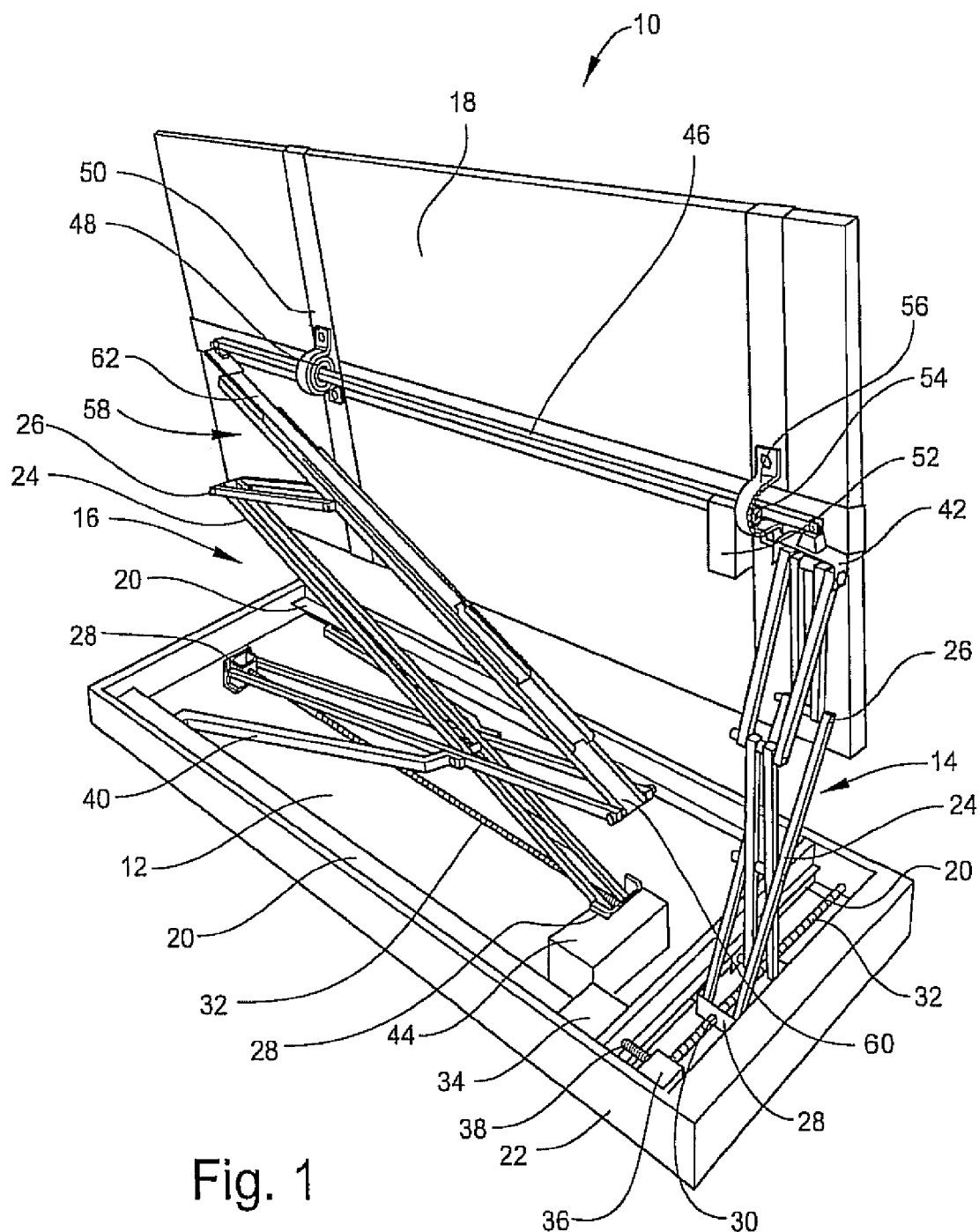
FIG. 1 is a perspective view of the solar panel adjustment device.

Referring now specifically to the drawings, an exemplary solar panel adjustment device is illustrated in FIG. 1 and is shown generally at reference numeral 10. As illustrated, the device 10 includes a base 12, a first pivot frame 14, a second pivot frame 16, and a solar panel 18 having a first end and a second end. The pivot frames 14, 16 may have a number of sizes, depending upon the application and aesthetic desires of the user, but any size that is structurally sound and able to withstand a broad range of temperatures, wind forces, and force loads is acceptable. Each pivot frame 14, 16 has a first end and a second end. At least one drive means adjusts the first pivot frame 14 and second pivot frame 16 independently of one another.

A first pivot frame 14 and second pivot frame 16 are engaged to the base 12. The first pivot frame 14 and second pivot frame 16 are engaged to the base 12 in such a manner that will allow the first pivot frame 14 and second pivot frame 16 to translate independently along the base 12. For example, as illustrated in FIG. 1, an end of the first pivot frame 14 is positioned within a guide 20 located on the base 12. Additionally, an end of the second pivot frame 16 is positioned within guides 20 located on the base 12. It should be noted that the guides 20, by way of example, represent just one way in which the first pivot frame 14 and second pivot frame 16 may translate along the base 12. It should be noted that the guides 20 could be tracks, wheels, rollers, a sliding mechanism, or the like, and may be employed to allow the first pivot frame 14 and second pivot frame 16 to translate along the base 12.

The base 12 may be larger than the solar panel 18, may have the same dimensions as the solar panel 18, or may be smaller than the solar panel 18, depending upon the desires of the user. The base 12 functions to stabilize the first pivot frame 14 and second pivot frame 16. Optionally, the base 12 may include four sides 22 which are connected to the base 12. The sides 22 are in a spaced apart relationship forming an interior void within. However, any suitable number of sides 22 may be used. Alternatively, the sides 22 may substitute for the base 12 and serve as the structural support in place of the base 12. In yet another alternative, the guides 20 could be embedded into the sides 22.

The first pivot frame 14 is attached to the solar panel 18 for adjusting the solar panel 11. The first pivot frame 14 may adjust the height and angle of the solar panel 18, and alternatively, depending upon the desired use, the first pivot frame 14 may adjust the solar panel 18 in the vertical direction and/or horizontal direction.

In the preferred embodiment, the first pivot frame 14 comprises a plurality of spaced apart scissor arms 24. The scissor arms 24 are rotationally or pivotally connected to an adjacent scissor arm 24 by pivot pins 26. One end of at least one scissor arm 24 is engaged to the base 12. Preferably, at least two ends of the scissor arms 24 are engaged to the base 12. As illustrated in FIG. 1, the ends of two scissor arms 24 are engaged to the base 12 through the use of guides 20 that are positioned on the base 12, allowing the ends of the two scissor arms 24 to translate along the base 12. The ends of the two scissor arms 24 may be adjusted by actuators, such as a threaded shaft 32, hydraulic cylinder, telescopic hydraulic piston, offset hydraulic jack, pulley system, or any other device that creates vector(s) motion, or in other words, a motion with a magnitude and at least one direction. As illustrated in FIG. 1, the two scissor arms 24 are linked together by a plate 28 that has a centrally located threaded bore 30. The threaded bore 30 is designed to receive a correspondingly threaded shaft 32 therethrough, which serves as the actuator in this exemplary embodiment. The threaded shaft 32 as used herein may be a dual threaded rod.

During use, the threaded shaft 32 is rotated by a drive means, causing the plates 28 to translate along the axis of the threaded shaft 32. The plates 28 may translate independent of one another, meaning that either plate 28 may translate independent of one another, or both plates 28 may translate together. As the plates 28 translate, the scissor arms 24 contract or expand, depending upon the directional rotation, causing the solar panel 18 to move in a vertical and/or horizontal direction. The drive means may include, but is not limited to, any mechanism that has the ability to rotate the threaded shaft 32, including, but not limited to a hand cranic. As illustrated in FIG. 1, the drives means may include a motor 34 connected to a gear box 36. The motor 34 is connected to the gear box 36 by way of a shaft 38, whereby the motor 34 rotates the shaft 38. The gear box 36 transfers the rotational energy produced by the shaft 38 to the threaded shaft 32 engaged to the first pivot frame 14. Alternatively, an actuator, such as a hydraulic cylinder, telescopic hydraulic piston, screw jack, offset hydraulic jack, pulley system, or any other device that creates vector(s) motion, may be utilized as a first pivot frame 14, and/or operate as a drive means.

The scissor arms 24 of the first pivot frame 14 of the present invention are illustrated as symmetrical. However, the present invention may utilize scissor arms 24 of varying lengths and sizes. Specifically, the lower scissor arms 24, positioned closer to the base 12, may be a longer length than the scissors arms 24 located closer to the solar panel 18. Additionally, the scissor arms 24 positioned near the base 12 may include off-set scissor arms, providing greater stability and control to the device 10. (The offset scissor arms described herein for the first pivot frame 14 are similar to the offset scissor arms 40 as described below). The offset scissor arms may be pivotally connected to the first pivot frame 14.

In the preferred embodiment, the first pivot frame 14 is engaged to a first end of the solar panel 18 for adjusting the solar panel 18. In one exemplary embodiment, the first pivot frame 14 should raise the solar panel 18 at least a height of half the distance of the width of the solar panel 18 to allow full rotation of the solar panel 18. However, the first pivot frame 14 may raise the solar panel 18 to any height to allow varying amounts of rotation of the solar panel 18. The first pivot frame 14 also has the ability to extend vertically to a point wherein the first pivot frame 14 is nearly a single vertical line to prevent the inhibition of rotation of the solar panel 18. The extension of the first pivot frame 14 to a single vertical line allows the first pivot frame 14 to be unobtrusive and not inhibit the rotation of the solar panel 18. The first pivot frame 14 may extend to any height relative to the second pivot frame 16 in order position the solar panel 18 at a desired angle in the vertical position. For example, the first pivot frame 14 may reach a height less than the height of the second pivot frame 16, causing the solar panel 18 to slope towards the first pivot frame 14. Alternatively, the first pivot frame 14 may reach a height more than the height of the second pivot frame 16, causing the solar panel 18 to slope towards the second pivot frame 16.

The first pivot frame 14 may be engaged to the solar panel 18 in a number of ways known to one skilled in the art. For example, the first pivot frame 14 may be engaged to the solar panel 18 by way of a platform, panel support structure, or centerpoint for connection that allows rotation of the solar panel 18, preferably along the north/south axis. As illustrated in FIG. 1, the first pivot frame 14 is engaged to the solar panel 18 by way of support brackets 42.

The first pivot frame 14 is engaged to the base 12 to provide the most stability and force absorption. Additionally, the first pivot frame 14 may be constructed of any material that is stable and capable of withstanding the applicable loads, stresses, and forces applied to the first pivot frame 14.

The second pivot frame 16 is attached to the solar panel 18 for adjusting the solar panel 18. The second pivot frame 16 may adjust the height and angle of the solar panel 18. Alternatively, depending upon the desired use, the second pivot frame 16 may adjust the solar panel 18 in the vertical direction and/or horizontal direction.

In the preferred embodiment, the second pivot frame 16 comprises a plurality of spaced apart scissor arms 24. The scissor arms 24 are rotationally or pivotally connected to an adjacent scissor arm 24 by pivot pins 26. One end of at least one scissor arm 24 is engaged to the base 12. Preferably, at least two scissor arms 24 are attached to the base 12. As illustrated in FIG. 1, the ends of the scissor arms 24 are engaged to the base 12 through the use of guides 20 that are located on the base 12, allowing the ends of the two scissor arms 24 to translate along the base 12. As illustrated in FIG. 1, the two scissor arms 24 are linked together by a plate 28 that has a centrally located threaded bore 30. The threaded bore 30 is designed to receive a correspondingly threaded shaft 32 therethrough, which serves as the actuator in this exemplary embodiment.

During use, the threaded shaft 32 is rotated by a drive means, causing the plates 28 to translate along the axis of the threaded shaft 32. As the plates 28 translate, the scissor arms 24 contract or expand, depending upon the directional rotation, causing the solar panel 18 to move in a vertical and/or horizontal direction. The drive means may include, but is not limited to, any mechanism that has the ability to rotate the threaded shaft 32, including, but not limited to a hand crank. As illustrated in FIG. 1, the drives means includes a motor 44 operationally connected to the threaded shaft 32 engaged to the second pivot frame 16. Alternatively, an actuator, such as a hydraulic cylinder, telescopic hydraulic piston, screw jack, offset hydraulic jack, pulley system, or any other device that creates vector(s) motion, may be utilized as a second pivot frame 16, and/or operate as a drive means.

The scissor arms 24 of the second pivot frame 16 the present invention are illustrated as asymmetrical. However, the present invention may utilize scissor arms 24 of varying lengths and sizes. Specifically, the lower scissor arms 24, positioned closer to the base 12, may be differing lengths than the scissors arms 24 located closer to the solar panel 18. As illustrated in FIG. 1, the offset scissor arms 40 engaged to the base 12 have a wide stance, thus enhancing the stability of the second pivot frame 16. In other words, the offset scissor arms 40 that engage the base 12 are angled outward from the pivot pin 26, creating an increased stable arrangement.

In the preferred embodiment, the second pivot frame 16 is engaged to a second end of the solar panel 18 for adjusting the second end of the solar panel 18. In one exemplary embodiment, the second pivot frame 16 should raise the solar panel 18 at least a height of half the distance of the width of the solar panel 18 to allow full rotation of the solar panel 18. However, the second pivot frame 16 may raise the solar panel 18 to any height to allow varying amounts of rotation of the solar panel 18. In one embodiment, the second pivot frame 16 may raise the solar panel 18 at an angle of about 90° or greater than 90° with respect to either the ground or base 12 for allowing the removal of debris, such as snow, which may accumulate on the solar panel 18. Raising the solar panel 18 to the desired angle with respect to the base 12 or the ground allows the debris to be dumped off the solar panel 18 for easy removal. Additionally, the second pivot frame 16 can extend to any height relative to the first pivot frame 14 in order to position the solar panel 18 at a desired angle in the vertical position.

The second pivot frame 16 may be engaged to the solar panel in a number of ways known to one skilled in the art. For example, the second pivot frame 16 may be engaged to the solar panel 18 by way of a platform, panel support structure, or centerpoint for connection that allows rotation of the solar panel 18, preferably along the north/south axis. The second pivot frame 16 is engaged to the base 12 to provide the most stability and force absorption. Additionally, the second pivot frame 16 may be constructed of any material that is stable and capable of withstanding the applicable loads, stresses, and forces applied to the second pivot frame 16.

Likewise, the second pivot frame 16 is attached to the solar panel 18 for adjusting the solar panel 18. The second pivot frame 16 may adjust the height and angle of the solar panel 18. Alternatively, depending upon the desired use, the second pivot frame 16 may adjust the solar panel 18 in the vertical direction and/or horizontal direction.

As illustrated in FIG. 1, the first pivot frame 14 and second pivot frame 16 may utilize a support arm 46 for attachment to the solar panel 18. In the exemplary embodiment of FIG. 1, at least one bearing 48 allows rotational movement of the solar panel 18 with respect to the support arm 46. The at least one bearing 48 is engaged to a bracket 50 secured to the solar panel 18. Optionally, any mechanism that allows rotational movement of the solar panel 18 with respect to the support arm 46 may be utilized, including, but not limited to a clevis mount or the like. Any number of mechanisms may be utilized to automatically rotate the solar panel 18, including actuators such as a hydraulic cylinder, telescopic hydraulic piston, screw jack, offset hydraulic jack, pulley system, or any other device that creates vector(s) motion. In the exemplary embodiment of FIG. 1, a rack and pinion system is utilized. The rack and pinion system includes a motor 52 attached to a gear 54. The gear 54 is positioned within a curved track 56 that is engaged to the solar panel 18 or bracket 50 positioned on the solar panel 18. The track 56 contains teeth that correspond to the gear teeth, allowing the gear 54 and motor 52 to rotate the solar panel 18. The motor 52 rotates the gear 54, and as the gear 54 rotates, the gear teeth engage the teeth of the track 56, thus causing the solar panel 18 to rotate.

Figure 2:
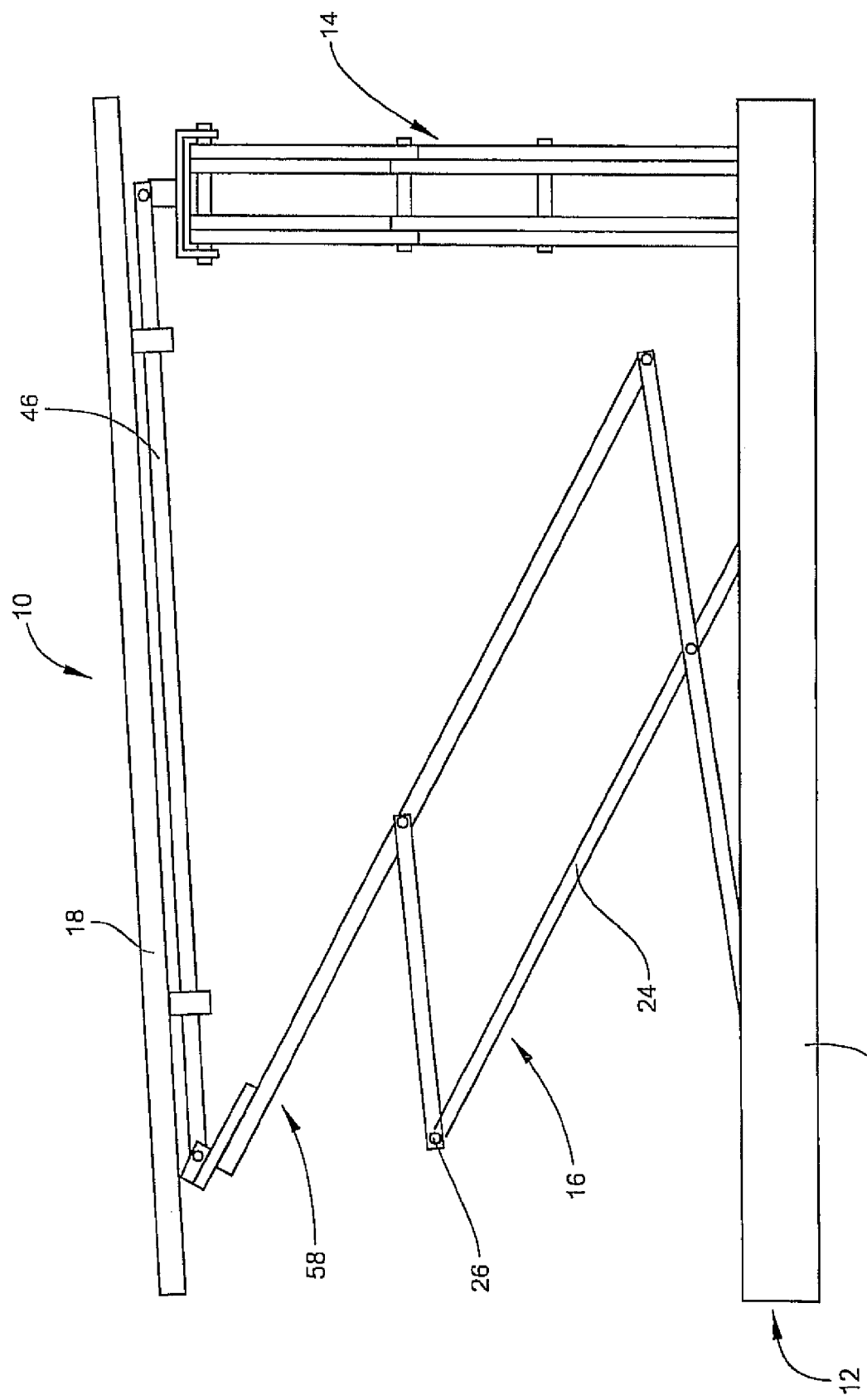
FIG. 2 is a side view of the solar panel adjustment device.
Figure 3:
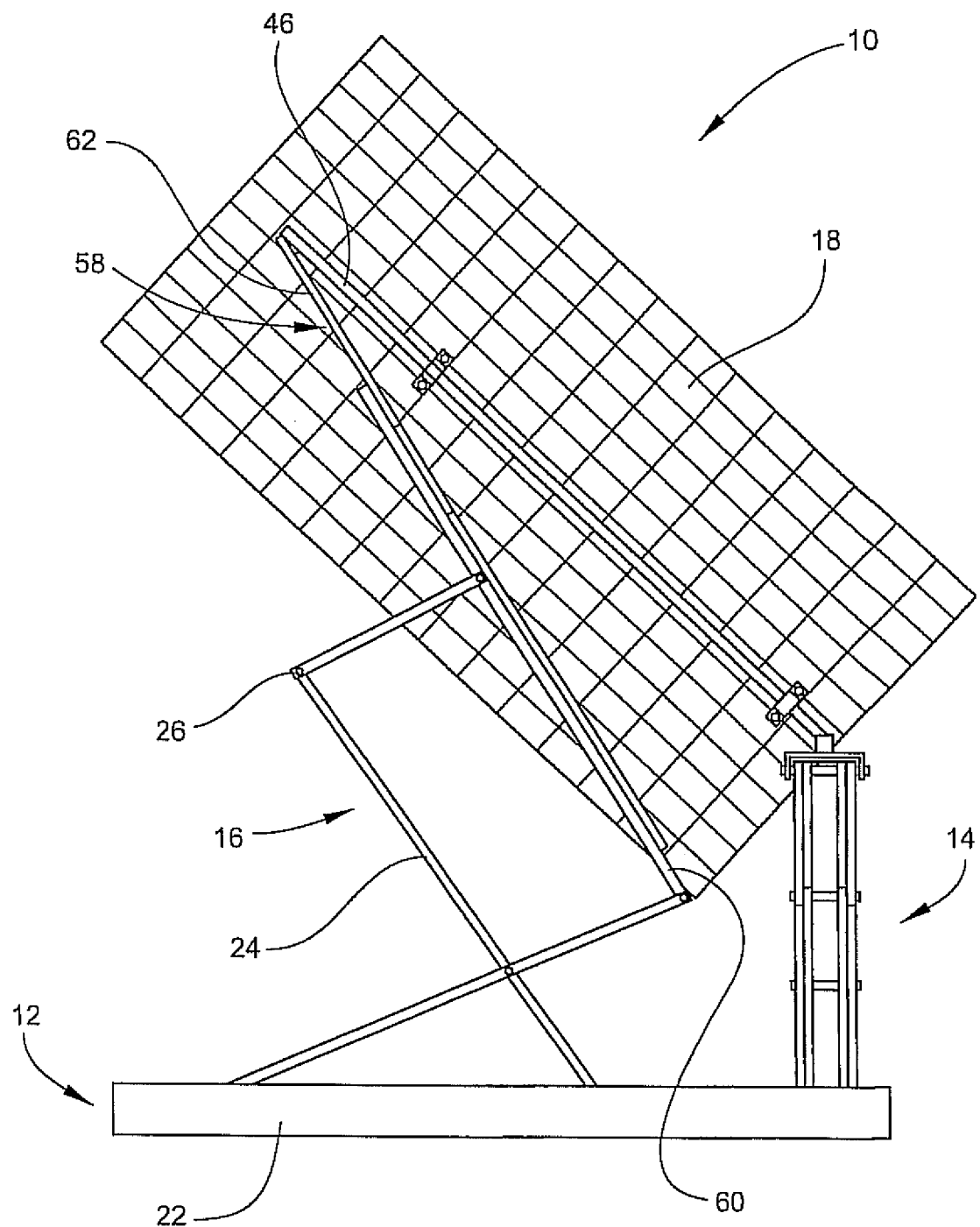
FIG. 3 is a side view of the solar panel adjustment device.

The second pivot frame 16 may be attached to the solar panel 18 in any number of ways. As illustrated in FIG. 1, the second pivot frame 16 comprises a slide mechanism 58 that extends and contracts based upon the movement of the second pivot frame 16 with respect to the solar panel 18. In the exemplary embodiment, the slide mechanism 58 is engaged to a scissor arm 24 and is attached to the support arm 46. Alternatively, the slide mechanism 58 may serve as a scissor arm 24. The slide mechanism 58, similar to that known in the art utilized in cabinetry, includes a stationary slide 60, and at least one translating slide 62 that translates within the stationary slide 60. When needed, the translating slide 62 translates within the stationary slide 60, essentially extending or contracting the length of the scissor arm 24. This translation is exemplified during the comparison of FIGS. 2 and 3. In FIG. 2, the sliding mechanism 58 is substantially contracting, but in the position illustrated in FIG. 3, the translating slide 62 has translated along the stationary slide 60, allowing the solar panel 18 to adjust.

Alternatively, the slide mechanism 58 may include any number of arrangements that allow the second pivot frame 16 to slide along the support arm 46. This arrangement allows the second pivot frame 16 to slide along the support arm 46 while the solar panel 18 is being adjusted. In other words, the support arm 46 engaged to the solar panel 18 is slidingly engaged to the second pivot arm 16. In another exemplary embodiment, the support arm 46 may contain an end portion that is in a telescoping relationship with the main portion of the support arm 46. In other words, the end of the support arm 46 that is engaged to the second pivot frame 16 is received within a cavity of the main portion of the support arm 46, which is engaged to the solar panel 18. In this exemplary embodiment, the support arm 46 is enlarging and decreasing in size depending upon the movement of the solar panel 18.

The first pivot frame 14 and second pivot frame 16 may be engaged to the solar panel 18 utilizing a number of different methods. For example, the bracket 50, as illustrated in FIG. 1, can be a "double t" structure that may be utilized to engage the first pivot frame 14 and second pivot frame 16 to the solar panel 18 for increased stability. The "double t" structure consists of the horizontal upper T portion located along the width of the solar panel 18, and the vertical bottom T portion extends along the center length of the solar panel 18.

The first pivot frame 14 and second pivot frame 16 may be attached to a support arm 46 using a clevis mount. The support arm 46 may rotate or the rotation may occur around the support arm 46.

The base 12 may further include attachment devices. The attachment devices (not shown) enable a base 12 to be attached to an adjacent base 12. The attachment devices may be attached to any side 22 of the base 12 or all sides 22 of the base 12 depending upon desires of the user. The base 12 may also include attachment devices that securely attach the base 12 to a structure, such as a roof or the like. In addition, the base 12 may also include at least one input/output port.

Figure 4:
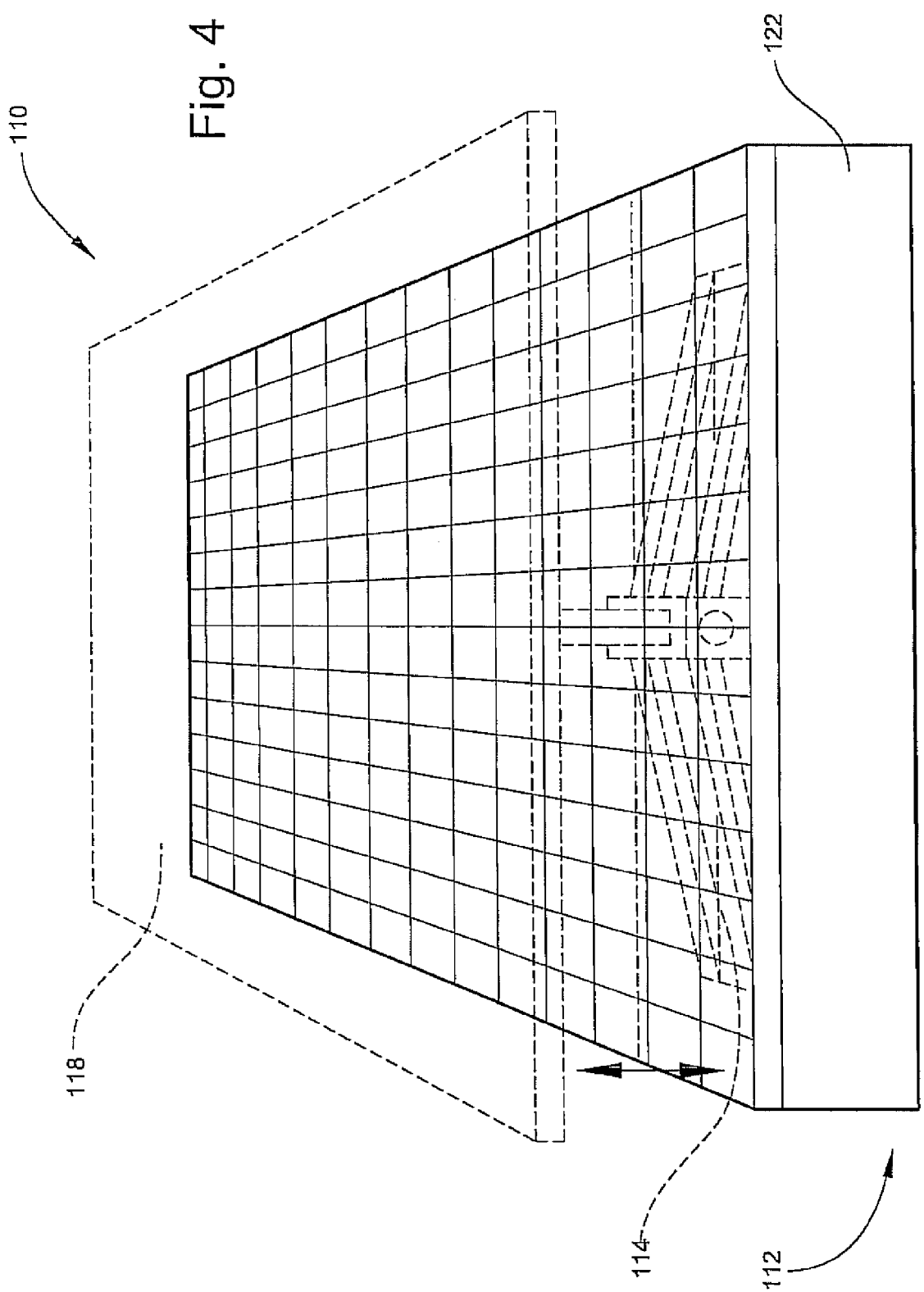
FIG. 4 is a view of the solar panel adjustment device, wherein the solar panel is recessed upon the base, thus being self-contained.

In an exemplary embodiment as illustrated in FIG. 4, the base 112 includes four sides 122. The sides 122 are in a spaced apart relationship forming an interior void within. The void is designed to receive the first pivot frame 114 and second pivot frame (not shown) in a depressed position, wherein the first pivot frame 114 and second pivot frame may be held wholly within the interior void within the sides 122. This arrangement allows the solar panel 118 to be positioned upon the top of the sides 122 as illustrated in FIG. 4. As shown in this exemplary embodiment, the device 110 is totally self-contained. In other words, the first pivot frame 114 and second pivot frame recess below the top of the sides 122, allowing the solar panel 118 to rest upon the sides 122 creating a self-contained system. Alternatively, in another exemplary embodiment, the solar panel 118 may also be recessed within the sides 122, depending upon the desires of the user, while also creating a self-contained unit.

The present invention may be operated by a control unit, such as a computer module or the like. The control unit operates the device 110, and adjusts the solar panel 118. The control unit may adjust the device 110 at the direction of a user, or the control unit may operate automatically. For example, the direction or movement of the sun may be detected, allowing the control unit to adjust the device 110 so that the solar panel 118 receives the maximum amount of sunlight. Alternatively, adverse weather conditions may be detected, causing the control unit to adjust the device 110 to prevent damage to the device 110. Additionally, the control unit may retract the device 110 to be self-contained within the sides 122, as defined above and in FIG. 4.

Figure 5:
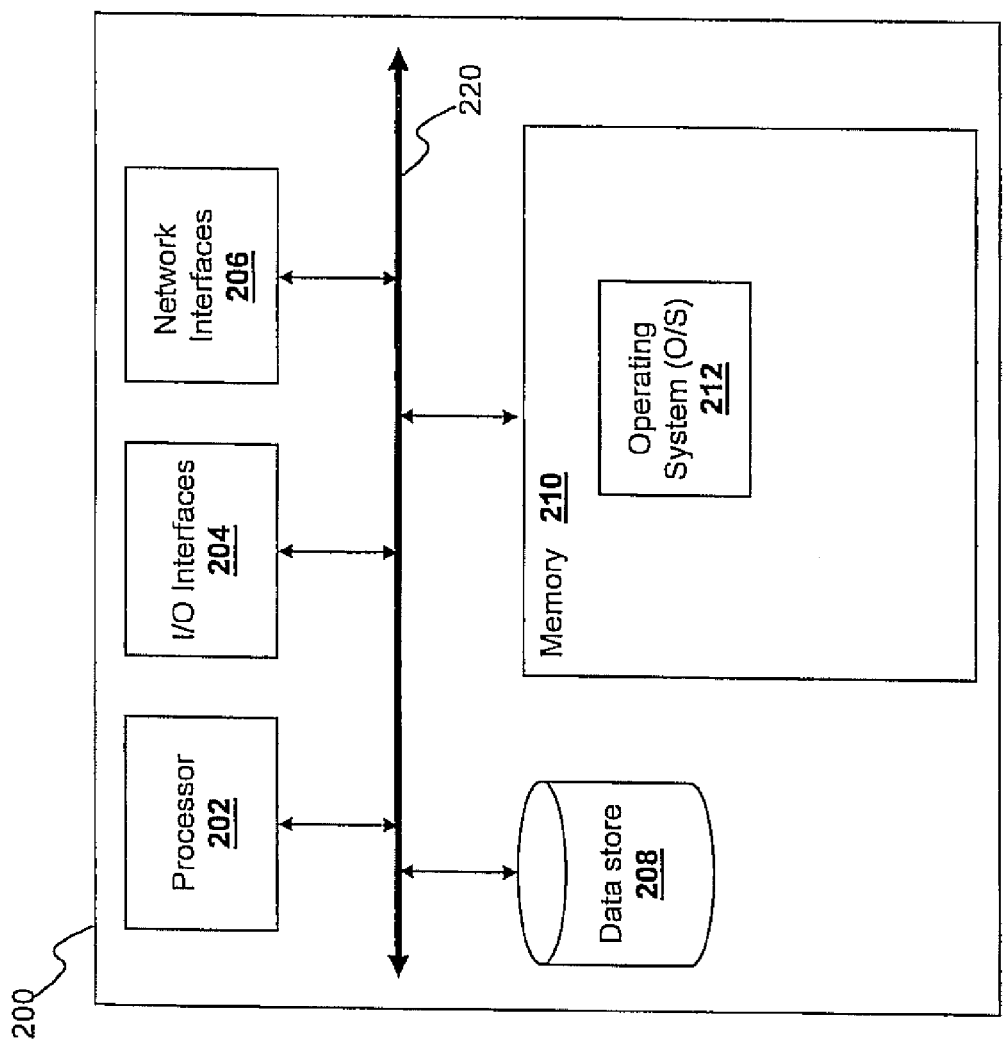
FIG. 5 is a flow diagram depicting the control unit.

In another exemplary embodiment as illustrated in FIG. 5, a block diagram illustrates a control unit 200, according to an exemplary embodiment of the present invention. The control unit 200 may be a digital computer that, in terms of hardware architecture, generally includes a processor 202, input/output (I/O) interfaces 204, network interfaces 206, a data store 208, and memory 210. The components (202, 204, 206, 208, and 210) are communicatively coupled via a local interface 220. The local interface 220 can be, for example but not limited to, one or more buses or other wired or wireless connections, as is known in the art. The local interface 220 can have additional elements, which are omitted for simplicity, such as controllers, buffers (caches), drivers, repeaters, and receivers, among many others, to enable communications. Further, the local interface 220 can include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the control unit 200, a semiconductor-based microprocessor (in the form of a microchip or chip set), or generally any device for executing software instructions. When the control unit 200 is in operation, the processor 202 is configured to execute software stored within the memory 210, to communicate data to and from the memory 210, and to generally control operations of the control unit 200 pursuant to the software instructions.

The I/O interfaces 204 can be used to receive user input from and/or for providing system output to one or more devices or components. User input can be provided via, for example, a keyboard and/or a mouse (not shown). System output can be provided via a display device and a printer (not shown). I/O interfaces 204 can include, for example, a serial port, a parallel port, a small computer system interface (SCSI), an infrared (IR) interface, a radio frequency (RF) interface, and/or a universal serial bus (USB) interface. The I/O interfaces 204 can communicate with the device 10.

The network interfaces 206 can be used to enable the control unit 200 to communicate on a network. For example, the control unit 200 can utilize the network interfaces 206 to communicate to the drive means or actuators for adjusting the device 10 and/or solar panel 18. The network interfaces 206 can include, for example, an Ethernet card (e.g., 10BaseT, Fast Ethernet, Gigabit Ethernet) or a wireless local area network (WLAN) card (e.g., 802.11a/b/g/n). The network interfaces 206 can include address, control, and/or data connections to enable appropriate communications on the network. The network interfaces 206 can communicate with the device 10.

A data store 208 can be used to store data, such as information received from the device 10, the solar panel 18, or other apparatuses connected via the local interface 220. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the control unit 200 such as, for example, an internal hard drive connected to the local interface 220 in the control unit 200. Additionally in another embodiment, the data store can be located external to the control unit 200 such as, for example, an external hard drive connected to the I/O interfaces 204 (e.g., SCSI or USB connection). Finally in a third embodiment, the data store may be connected to the control unit 200 through a network, such as, for example, a network attached file server via network interface 206.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 can have a distributed architecture, where various components are situated remotely from one another, but can be accessed by the processor 202. Additionally, software from the data store 208 can be loaded into the memory 210.

The software in memory 210 can include one or more software programs, each of which includes an ordered listing of executable instructions for implementing logical functions. The software in the memory system 210 includes the suitable operating system (O/S) 212. The operating system 212 essentially controls the execution of other computer programs and provides scheduling, input-output control, file and data management, memory management, and communication control and related services. The operating system 212 could be written specifically for the device 10, or other commercially available programs, such as Windows by Microsoft, Solaris by Sun Microsystems, Linux, or Leopard by Apple.

The term solar panel is used to define any instrument that collects, diverts, concentrates, or receives the sun's rays or solar energy. The solar panel may include, but is not limited to a heliostat system, a photovoltaic system, a solar thermal system, combinations thereof, or the like. These instruments are well known to one of ordinary skill in the art. The term solar panel is also used herein to define an array, or the linking of multiple solar panels, as used herein, together.

The device 10 may be composed of any material. For example, the material may include, but is not limited to, steel, carbon fiber, fiberglass, tungsten, plastic and/or plastic composites.

Figure 6:
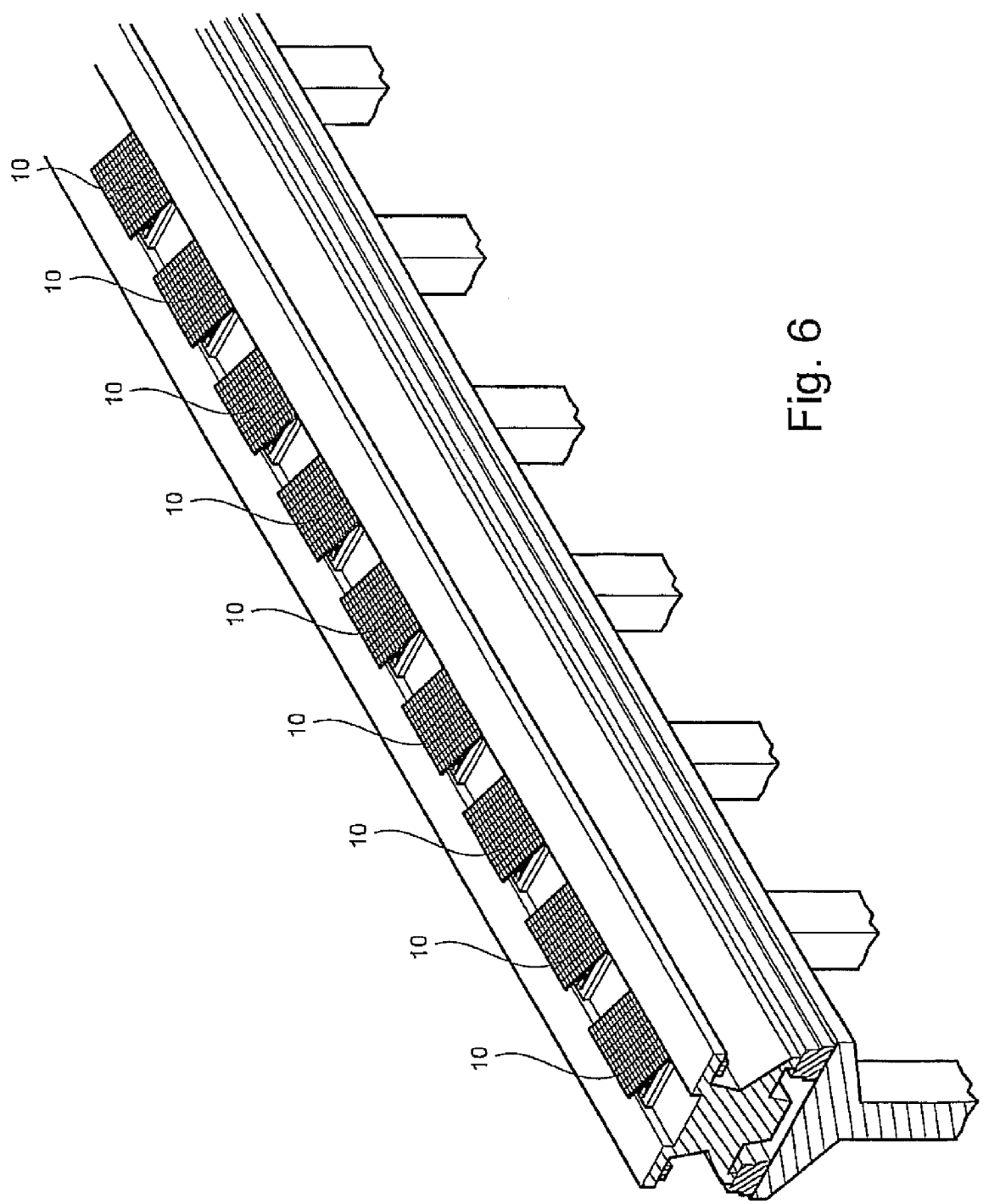
FIG. 6 is an exemplary embodiment of the solar panel adjustment device located within a rail system.

The placement of the device 10 may be on any number of locations. The most prevalent location for solar panels is in open fields or on the roof of a single, family residence, residential or commercial building. Alternatively, the present invention may be utilized in the railroad industry or transportation industry. The railroad industry includes, but is not limited to, a railway system, a traditional gage railroad, or non-traditional railroad. For example, the device 10 may be located between the rails of a traditional gage railroad track for generating electricity to power the trains operating on the track, to power the signals associated with the operation of the railroad, and/or generate electricity for external uses. Alternatively, the device 10 may be utilized in the transportation industry with "nontraditional" rails, such as a maglev or magnetically levitating train. In this situation the device 10 could be located within the railway system as indicated in FIG. 6.

The device 10 is placed between the rails, and is positioned in such a manner that the solar panel 18 may be recessed below the height of the tracks so that a train will not damage the solar panel 18 or device 10 while traveling on the rails and over the device 10. As illustrated in FIG. 6, when a train is not traveling on the rail in the vicinity of the devices 10, the devices 10 are adjusted upward to capture the maximum amount of sunlight. Additionally, the devices 10 may be spaced apart so not to suffer from the "shadow effect." Essentially, the shadow effect results from the placement of the devices 10 too close to one another, preventing the maximum amount of sunlight from being received by a solar panel 1S, because an adjacent solar panel 18 is placed too close and casts a shadow thereupon an adjacent solar panel 18.

Although the present invention has been illustrated and described herein with reference to preferred embodiments and specific examples thereof it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A solar panel adjustment device, comprising:
   a solar panel having a first end and a second end for receiving sunlight;
   a first pivot frame engaged to the first end of the solar panel for adjusting the solar panel, the first pivot frame is adjustable from a substantially horizontal position to a substantially vertical position when fully extended;
   a second pivot frame engaged to the second end of the solar panel for adjusting the solar panel, the second pivot frame is adjustable from a substantially horizontal position to a substantially vertical position when fully extended;
   at least one drive means for adjusting the first pivot frame and the second pivot frame independently of one another, and
   a control unit comprising a processor, an input/output interface, at least one network interface, a data store, and a memory device.

2. The solar panel adjustment device of claim 1, further comprising a bracket engaged to the solar panel, whereby the first pivot frame is engaged to the bracket.

3. The solar panel adjustment device of claim 1, further comprising a base for engaging the first pivot frame and the second pivot frame.

4. The solar panel adjustment device of claim 1, wherein the first pivot frame and the second pivot frame are substantially similar to scissor jacks.

5. The solar panel adjustment device of claim 1, further comprising a guide positioned on the base for receiving an end of the first pivot frame that allows translational movement of the first pivot frame along the base.

6. The solar panel adjustment device of claim 1, further comprising a guide positioned on the base for receiving an end of the second pivot frame that allows translational movement of the second pivot frame along the base.

7. A solar panel adjustment device, comprising:
   a base;
   a solar panel having a first end and a second end for receiving sunlight;
   a first pivot frame having a first end and a second end, wherein the first end of the first pivot frame is engaged to the first end of the solar panel for adjusting the solar panel, and the second end of the first pivot frame is engaged to the base and translates along the base, the first pivot frame is adjustable from a substantially horizontal position to a substantially vertical position when fully extended; and
   a second pivot frame having a first end and a second end, wherein the first end of the second pivot frame is engaged to the second end of the solar panel and the second end of the second pivot frame is engaged to the base, and the second pivot frame translates along the base independently of the first pivot frame without contacting the first pivot frame for adjusting the solar panel, whereby the second pivot frame is adjustable from a substantially horizontal position to a substantially vertical position when fully extended and the second pivot frame includes a plurality of scissor arms that are engaged with each other by a plurality of pivot pins, wherein the scissor arm adjacent the base is angled outward from the pivot pin, creating an increased stable arrangement.

8. The solar panel adjustment device of claim 7, further comprising a bracket engaged to the solar panel, whereby the first pivot frame is engaged to the bracket and the second pivot frame is engaged to the bracket.

9. The solar panel adjustment device of claim 7, wherein the first pivot frame and the second pivot frame are substantially a scissor jack.

10. The solar panel adjustment device of claim 7, further comprising a guide positioned on the base for receiving an end of the first pivot frame that allows translational movement of the first pivot frame along the base.

11. The solar panel adjustment device of claim 7, further comprising a guide positioned on the base for receiving an end of the second pivot frame that allows translational movement of the second pivot frame along the base.

12. The solar panel adjustment device of claim 7, wherein the first pivot frame and the second pivot frame are actuators.

13. A solar panel adjustment device, comprising:
a base;
a first pivot frame having a first end and a second end, wherein the first end of the first pivot frame is engaged to the first end of the solar panel for adjusting the solar panel, and the second end of the first pivot frame is engaged to a first guide positioned on the base, the first pivot frame is adjustable from a substantially horizontal position to a substantially vertical position when fully extended; and
a second pivot frame having a first end and a second end and consists of a plurality of spaced apart scissor arms engaged together by pivot pins, wherein the first end of the second pivot frame is engaged to the second end of the solar panel and the second end of the second pivot frame is engaged to a second guide positioned on the base, translates along the base for adjusting the solar panel, and is angled outward from the pivot pin, creating an increased stable arrangement, the second pivot frame is adjustable from a substantially horizontal position to a substantially vertical position when fully extended and the second pivot frame translates along the base independently of the first pivot frame without contacting the first pivot frame for adjusting the solar panel.

14. The solar panel adjustment device of claim 13, further comprising at least one side wall positioned on the base.

15. The solar panel adjustment device of claim 13, further comprising a plate engaged to the second end of the first pivot frame and a plate engaged to the second end of the second pivot frame, wherein the plates are engaged to at least one actuator for adjusting the plates along the base.

16. The solar panel adjustment device of claim 13, further comprising a support arm positioned on the solar panel for engaging the first pivot frame and the second pivot frame to the solar panel.

17. The solar panel adjustment device of claim 13, further comprising a telescoping arm located on the second pivot frame aiding in the engagement of the second pivot frame to the solar panel, wherein the telescoping arm comprises a first portion that is engaged to the second pivot frame and a second portion engaged to the solar panel and the second portion is received within the first portion.

18. The solar panel adjustment device of claim 13, further comprising a support arm engaged to the solar panel that is slidingly engaged to the second pivot arm.

19. The solar panel adjustment device of claim 13, wherein the solar panel adjustment device is utilized in a railway system.

20. The solar panel adjustment device of claim 13, wherein the solar panel adjustment device is operated by a control unit for adjusting the solar panel.

* * * * *